Oct. 7, 1958   P. F. M. GLOESS   2,855,593
ELECTRIC CIRCUIT FOR USE WITH CATHODE RAY TUBES
Filed Oct. 30, 1941   3 Sheets-Sheet 1
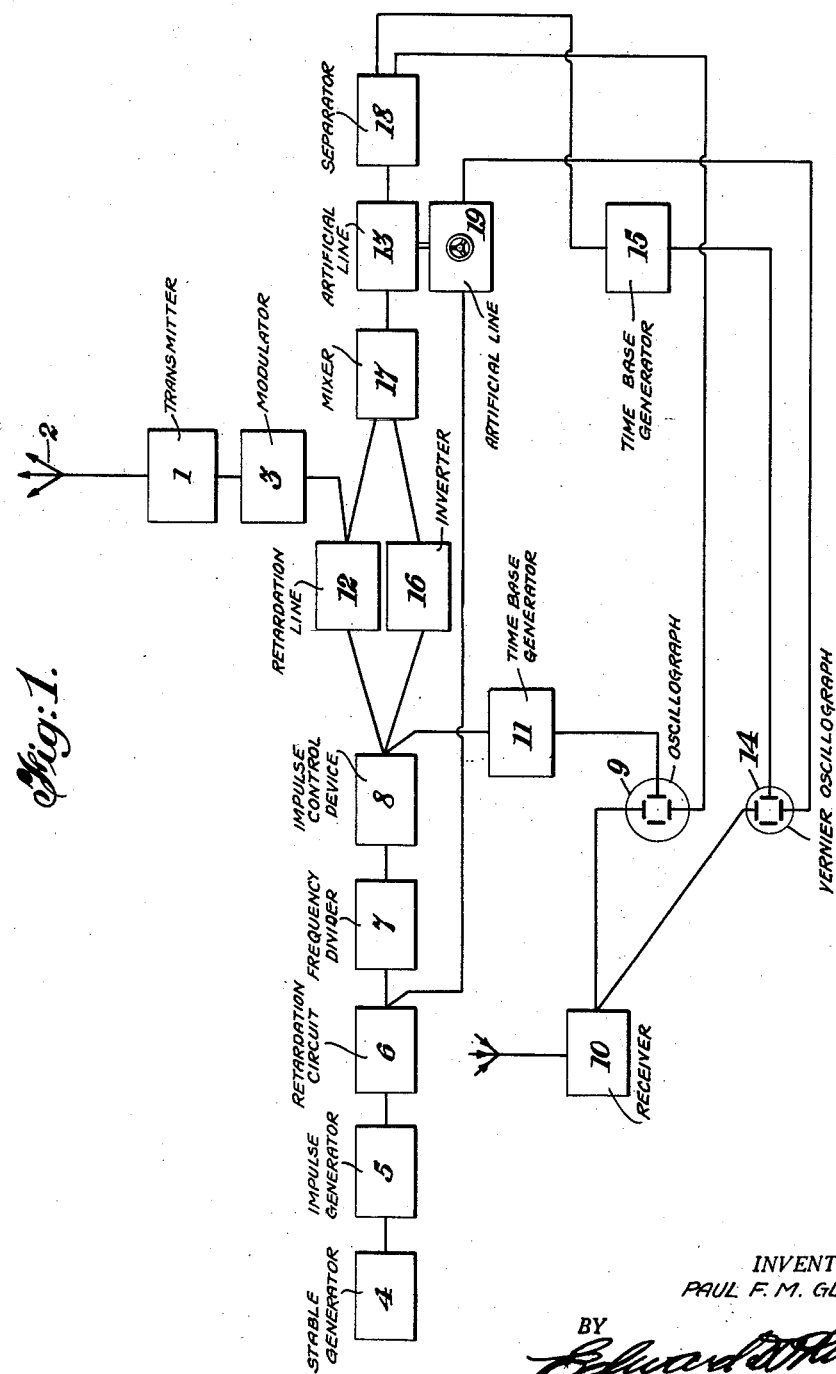
INVENTOR.
PAUL F. M. GLOESS
BY
ATTORNEY

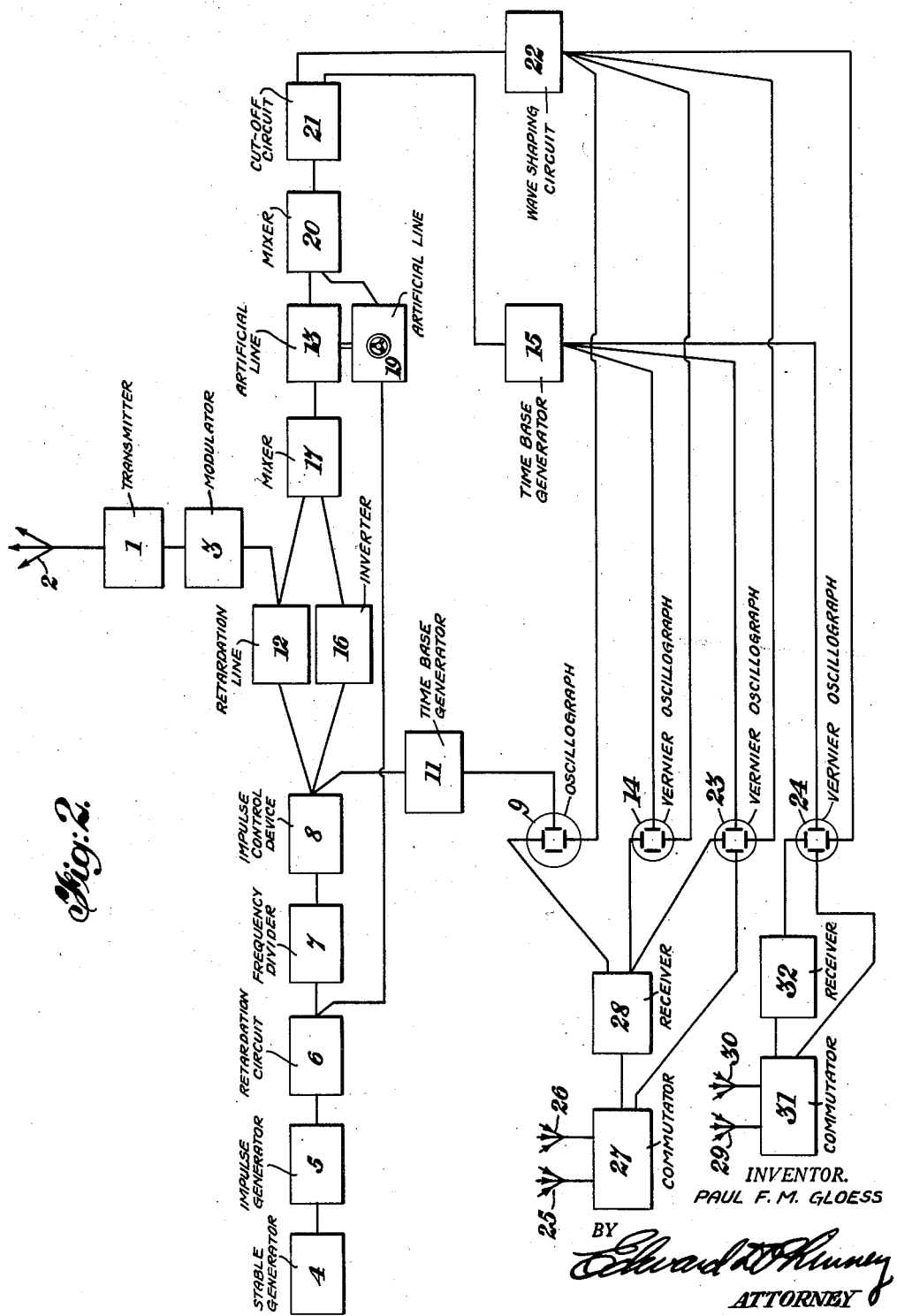

Oct. 7, 1958 P. F. M. GLOESS 2,855,593
ELECTRIC CIRCUIT FOR USE WITH CATHODE RAY TUBES
Filed Oct. 30, 1941 3 Sheets-Sheet 3
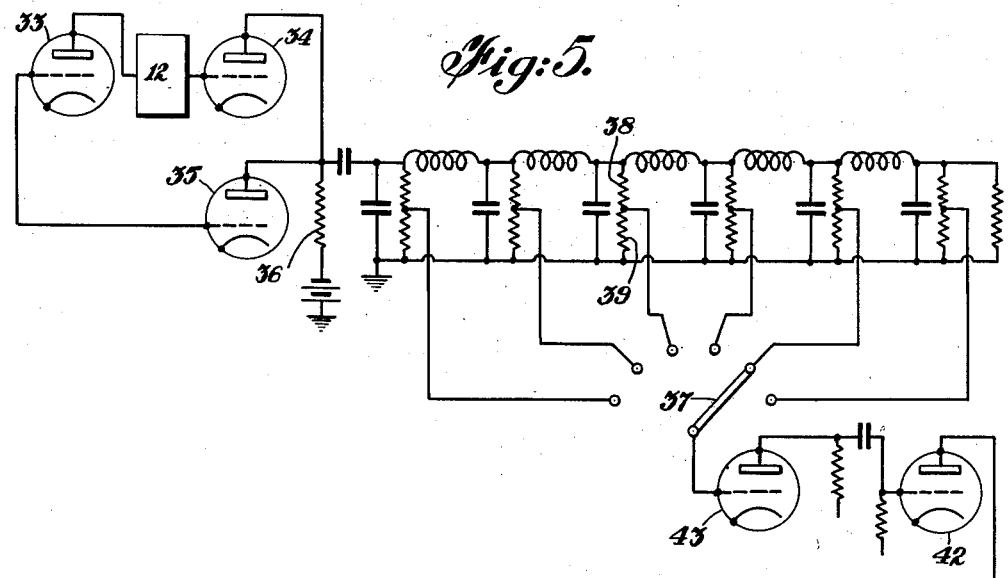
*Fig:5.*
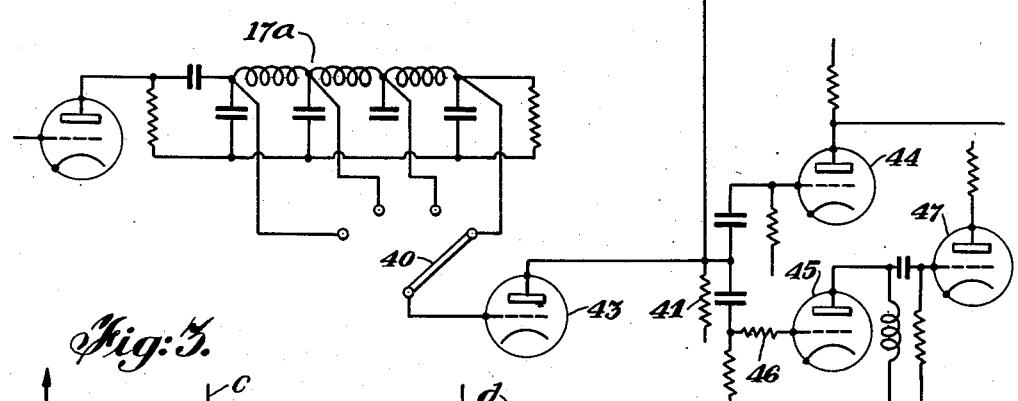
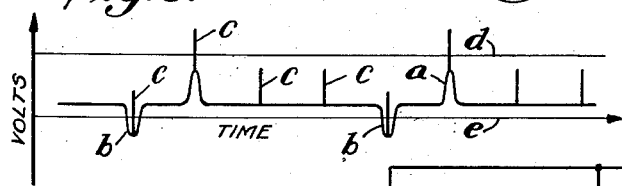
*Fig:3.*
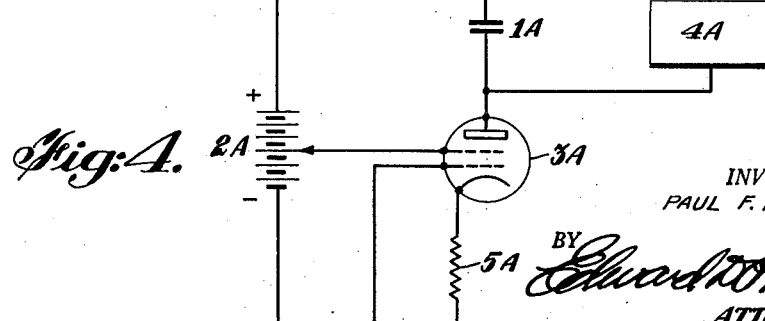
*Fig:4.*
INVENTOR.
PAUL F. M. GLOESS
BY
ATTORNEY

United States Patent Office 2,855,593
Patented Oct. 7, 1958

2,855,593

ELECTRIC CIRCUIT FOR USE WITH CATHODE RAY TUBES

Paul F. M. Gloess, Paris, France, assignor to International Standard Electric Corporation, New York, N. Y.

Application October 30, 1941, Serial No. 417,180
In France April 2, 1940

Section 1, Public Law 690, August 8, 1946
Patent expires April 2, 1960

16 Claims. (Cl. 343—11)

The present invention relates to electric circuits which may employ indicating apparatus such as cathode ray oscillographs, particularly for the purpose of measuring intervals of time elapsing between predetermined electrical phenomena and to effect the regulation of a given value (for example, a mechanical displacement in time) in order to cause the coincidence of one or a plurality of indices, representing the value at a given instant, with a fixed or even adjustable point.

The invention relates particularly to the employment in such systems of retardation line circuits which serve as reference elements or indices with respect to indicating apparatus such as cathode ray oscillographs.

The invention will find application in many fields, but for the sake of simplicity, I shall describe its application to a system of measuring and comparing by means of electromagnetic waves, the distance of a movable object or an obstacle.

Arrangements are known for detecting or measuring distance which consists in the emission of radio electric impulses and to observe on an indicator apparatus reflections of these emitted impulses or wave peaks coming from a movable or stationary object, an airplane, etc.

By applying the present invention to the solution of such a problem, the distance from a movable object can be determined with great precision by observing the effect of the reflected impulses or wave peaks on a measuring apparatus called a "Divider" which makes possible observation of received impulses or wave peaks within a limited time before and after the arrival of the reflected impulse or wave peak.

Such observation may be made on a so-called "vernier" oscillograph and this can be done with great precision by moving a top of reference impulse opposite a received reflected wave peak indication. The selection of the interval of time of such short duration is effected by means of another so-called "panoramic" oscillograph, the sweep time of which is equal to the maximum duration of the return trip of the electromagnetic waves to the stationary or movable object which is the farthest from the point of observation.

The different reflected wave peaks corresponding to the various movable objects may be observed on this oscillograph and means are provided for displacing a reference impulse to a position opposite to the one which is chosen for measuring on the vernier oscillograph, the observation being during an interval of time encompassing the observed wave peak.

Means may be associated with the distance measuring instrument for determining the direction of the movable object, e. g. by means of two directive antenna systems, one of which is displaced in the vertical plane for finding the site or vertical angle of elevation and the other, in the horizontal plane for finding the bearing.

I shall now describe an application of the invention to the control of anti-aircraft firing and shall give certain numerical values, but solely for the purpose of clearly explaining the nature of the invention and not to limit the same.

The invention will be described in connection with the drawings in which:

Fig. 1 represents a block diagram of the detection by electromagnetic means of a movable or stationary object and in which the characteristic features of the present invention are employed:

Fig. 2 is an improvement of the arrangement shown in Fig. 1;

Fig. 3 is a diagram representing the form of the waves;

Fig. 4 is a circuit arrangement of the time base of the vernier; and

Fig. 5 is a circuit arrangement used in the measuring operation.

The arrangement shown in Fig. 1 comprises a transmitter 1 equipped with an antenna 2, the characteristics of which depend on the conditions which must be satisfied. As the particular form of antenna has no direct bearing on the present invention the generalized showing is considered sufficient. The wave length may be 50 centimeters and may be in the form of impulses or wave peaks of 0.5 microsecond at a cadence of 5000 per second, i. e., at intervals of 200 microseconds. This interval of time corresponds to a round trip of 60 kilometers by the electromagnetic waves from the transmitter to a reflecting object and, therefore, may be used to detect movable objects up to 30 kilometers.

The impulses may be produced by any known arrangement, for example, by differentiation of a crystal controlled frequency.

A stable generator 4 having a frequency of 200,000 periods per second controls an impulse generator 5 of the same frequency and the device 6 makes possible the determination of the duration of the impulses by means of a circuit employing a retardation line.

This initial impulse cadence of 200,000 per second has been selected for reasons to be presently explained.

The purpose of the device 7 is to reduce the cadence of the impulses of 200,000 per second to the desired value of 5,000 per second. For this purpose, I provide a demultiplier having a ratio of 40 and controlled by impulses from the devices 6 at a cadence of 5,000 per second. A second controlling arrangement 8 for the width of the impulses is employed for giving to these impulses the desired duration. The devices 7 and 8 may be of any suitable form, for example, the demultiplier 7 may comprise a frequency divider circuit of known type and the device 8 a known form of retardation circuit.

The impulses leaving the apparatus 8 are sent over a line 12 having a retardation of 5 microseconds and the purpose of which will be presently explained to the modulator 3 of the transmitter 1. The transmitter will thus send out impulses or wave peaks having a means duration of 0.5 microsecond and a cadence of 5,000 per second.

A cathode ray oscillograph 9 is provided for observing the reflected impulses or wave peaks received through the agency of the receiver 10. The sweeping of this panoramic oscillograph has a cadence of 5,000 per second, which as above stated, represents a maximum exploring distance of 30 kilometers. The voltages necessary for the sweep circuit are supplied by the time base generator 11 which is synchronized by means of impulses from the device 8. Since the impulses are transmitted to the transmitter over the line 12 which has a retardation of 5 microseconds, the return of the saw-tooth sweep of the oscillograph 9 begins 5 microseconds ahead of the real transmission of the impulses or wave peaks from antenna 2 whereby the return period of the spot will not interfere with the start of the sweep.

In order to determine exactly the return voyage of the reflected impulse or wave peak, i. e. the position of the reflected wave peak with respect to the time base, in accordance with the present invention, an adjustable retardation line is used whereby a reference impulse may be produced on the oscillograph, the position of which with respect to time is adjustable by means of artificial lines. When the reflected wave peak and the impulse of reference coincide, then the position of the controlling elements of the artificial line is used for measuring the distance. In order to cause the exact coincidence of the reflected wave peak and reference impulse, an auxiliary, vernier oscillograph is used, the sweep time of which, in the present case, is reduced to a period extending from 5 microseconds before to 5 microseconds after the arrival of the reflected wave peak.

For this purpose, the operator sends over an artificial line 13 having a maximum lag of 200 microseconds, reference impulse obtained from the output of the line 12. In order to simplify the equipment, this retardation line is provided with a relatively low frequency cut-off of 200 kc. This retardation line is variable and the reference impulse produced by it is applied, e. g. at the opposite polarity to the reflected wave peak, to the vertical deflection plates of cathode ray oscillograph 9 and will thus appear in the opposite sense as compared to the reflected wave peak. By adjusting the retardation line 13, the operator will cause the reflected wave peak and the reference impulse to coincide. The position of the controlling elements of the line 13 at this moment will indicate the approximate distance only, because the spread form of the reference impulse due to its passage through this line having a low frequency cut-off removing the high harmonics and due to the fact that the distances indicated on oscillograph 9 are too great.

In order to measure the distance with greater exactitude by means of the vernier oscillograph 14 which is designed to cover a smaller distance field, a time base generator 15 is started 5 microseconds ahead of the instant when the reference impulse is received from the artificial line 13. For this purpose, a second reference impulse is used which is 5 microseconds ahead of the reference impulse applied to the panoramic oscillograph 9. This second reference impulse which has an advance of 5 microseconds is taken from control arrangement 8 ahead of the artificial line 12, the retard of which is exactly 5 microseconds.

Before these two series of impulses spaced from one another by 5 microseconds are combined, the impulses obtained directly from the device 8 are inverted in the circuit 16 (e. g. an inverting tube) so as to permit their final separation from the reference impulses of oscillograph 9. The mixture of these two series of impulses, inverted with respect to one another, is accomplished in the device 17 and from here the impulses are simultaneously applied to the line 13 so that they will both be adjustably retarded equally. The output of the line 13 will, therefore, contain two deformed impulses of opposite polarity, the deformation being due to the low frequency cut-off of this line. The device 18 is provided to separate by polarity the reference impulse, which is then applied to the oscillograph 9, from the impulse which controls the sweep circuit 15 of the vernier oscillograph 14 and which is of inverse polarity and advanced with respect to the former by 5 microseconds.

If one used in the vernier oscillograph the reference impulse coming from line 13 which, as above stated, is applied to the panoramic oscillograph 9, then the desired precision would not be attained in the measuring on account of the shape of the impulse produced by the artificial line 13 which has a slight frequency cut-off. In order to obtain a very exact reference impulse, this impulse is replaced by a sharp impulse produced, at the same instant as the reference impulse is taken from 18, at the output of the impulse generator 6 which produces sharp impulses at a cadence of 200,000 per second, i. e., which are spaced exactly 5 microseconds from one another. Since the sweep circuit of the vernier oscillograph is limited between 5 microseconds ahead and 5 microseconds after the occurrence of the reference impulse in the output of line 13, only a single sharp impulse will be observed on this vernier oscillograph which will be in synchronism with the reference impulse coming from line 13 but originating in the device 6, the preceding and succeeding impulses falling outside of the periods of the sweep circuit.

In order to effect the displacement of this sharp reference impulse within the space of 10 microseconds, a variable artificial line 19 having a maximum retardation of 5 microseconds is provided in the path of the sharp impulse coming from the device 6. This line has a high-frequency cut-off so as to avoid the introduction of any distortion of the impulse, thus to insure great precision in the measuring. Furthermore, the line control is mechanically coupled with that of the artificial line 13 so that the law of increase in each line be the same in every interval of 5 microseconds. In order to obtain an apparently continuous spot on the vernier, every time the line 19 attains its maximum lag of 5 microseconds it will suddenly fall back to zero. This will not produce discontinuity because the neighboring impulse will then appear on the screen of the vernier without modifying the appearance of the oscillograph.

Fig. 2 shows an improvement on Fig. 1 so as to insure proper centering of the impulses on the observation screens with great precision and to permit their combination with apparatus which at the same time determines the position of the movable object being detected.

The reference numerals are the same in both figures for elements occurring in both.

The sweep circuit of the vernier is started by an impulse which is retarded by the artificial line 13, but not in a precisely continuous manner. The line is constituted by cells producing each a retardation of approximately 2 microseconds. The disturbing effect will be that the reflected and reference spots will not be exactly centered on the screen of the vernier.

The impulses originating in the artificial line 13 and line 19 are mixed in the device 20 so as to superimpose the spread impulses coming from line 13 on the sharp impulses coming from line 19. The wave shape shown in Fig. 3 will be obtained with the positive impulses *a* spaced by a cadence of 5,000 per second after passing through the lines 12 and 13, the spread inverted impulses *b* having the same cadence after traversing the inverter 16 and line 13. The last-mentioned impulses are 5 microseconds ahead of impulses *a*, this being the delay of the transmission line 12. These impulses are added to the sharp impulses *c* which have a cadence of 200,000 P. P. S., all positive.

In order to obtain a reference impulse, a separating circuit is used which permits only the passage of peaks above a certain potential represented by the straight line *d* in Fig. 3. In this manner, sharp impulses will be obtained at a cadence of 5,000 P. P. S. and having a lag which is adjustable by the combination of the retardation lines 13 and 19, these impulses serving for the purpose of reference.

The starting impulses for the vernier time base which must advance by 5 microseconds with respect to the reference impulse are obtained by means of a separator like the one above described, but operating in the opposite sense. In this manner, the combination of the impulses *b* and *c* of Fig. 3 below potential *e* will be selected.

After passage through a circuit having a low time constant and a new amplitude selection, a sharp impulse corresponding to the start of the impulse *c* will be superimposed on the spaced impulse *b* which is then suppressed by a suitable cut-off circuit.

The assembly of these elements which is necessary for performing these operations is symbolically represented at 21. Details of the circuits of 21 are not given since they are familiar to those skilled in the art.

In order to cause the reflected wave peaks and reference impulses to coincide, an arrangement 22 may be provided for giving the reference impulses a trapezoidal form. This can be accomplished, e. g. by known means such as wave limiters for both the upper and lower portion thereof.

In the preceding description, I have spoken only of the provision of a single vernier oscillograph to determine exactly the distance of the movable object. One can provide in addition to this vernier oscillograph other oscillographs, the purpose of which is to determine the respective angular positions in the horizontal and vertical planes which are jointly designated by the terms "bearing" and "elevation." In accordance with one feature of the invention, these two vernier oscillographs 23 and 24, Fig. 2, are fed from the same time base 15 and receive equally the impulse of reference which is sent to the vernier 14 for measuring the distance.

The angle measurements may be accomplished in the well-known manner and particularly by employing in each case two directive antennas having variable overlapping radiation patterns. The angle is determined by displacing the antenna system until equal indications are obtained in the two directional elements constituting each of these systems. A commutator may be used for this purpose to connect first one and then the other one of the directional elements with a receiver, and from there, with the oscillograph. The received two peaks are separated from one another horizontally by introducing in one case, an electromotive force which is continuous in the sweep circuit of the vernier oscillograph under consideration. The two directional elements may be connected to the same receiver by introducing in one of the two an additional lag by a suitable device and by compensating for the weakening of the signal caused in the delay line.

The same type of device may be used for finding the elevation.

Fig. 2 illustrates the directive antenna systems for determining the bearing and the antennae systems are indicated at 25 and 26, 27 being the combined commutator for the antennae and means for starting the sweep circuit of oscillograph 23.

The receiver 28 is used both for measuring the distance and for determining the bearing. It may be provided with two distinct medium frequency circuits, one having a narrow band feeding only the panoramic oscillograph 9 and the other having a wide band and feeding the verniers provided for measuring distance and the bearing and indicated at 14 and 23.

Owing to this arrangement, a better signal to noise relationship can be obtained for the panoramic oscillograph for which the deformation of the impulse caused by a very selective circuit would not be detrimental.

In order to determine the elevation, the antennae 29 and 30, the commutator 31, and the receiver 32, having a wide band are used in the same manner as above described in connection with the bearing indications.

Figs. 4 and 5 illustrate circuits that may be used.

Fig. 4 exemplifies a time base generator for the vernier systems.

This time base generator is composed essentially of a condenser 1A which is charged by a battery 2A through a pentode 3A, the sudden discharge of the condenser 1A being obtained by means of a discharging circuit 4A of any well-known type, either a thyratron or a vacuum tube, or a combination of vacuum tubes. The time of the condenser discharge is determined by the controlling reference impulse of the vernier sweep circuit which is produced as explained in connection with Fig. 1 and which is five microseconds ahead of the reflected peaks. The constants of these elements are determined in such a manner that the condenser attains its maximum charge at the end of 10 microseconds. Thus, a limited sweep will be produced which starts 5 microseconds ahead of the reflected peak and ends 5 microseconds after this peak. During the remaining 190 microseconds, the luminous spot of the cathode ray tube is extinguished in the following manner: A resistance 5A is provided in the circuit of the pentode 3A, the potential drop at the terminals of this resistance is positive during the charging of the condenser which corresponds to the 10 microseconds sweeping of the oscillograph and is annulled as soon as the condenser is charged during the rest period of the spot for the remaining 190 microseconds. This potential is used for controlling the polarization of the modulating grids of the vernier oscillographs to cause the extinguishing of the spot at the end of the sweep.

Fig. 5 is an exemplification of certain elements described in connection with Fig. 2 and particularly of the devices for measuring the distance. It will be remembered that in the description of this figure, the same reference numerals that are used in Fig. 1 represent the same elements. Fig. 5 shows a detailed circuit for producing the impulses which are applied to the retardation line 13 having a low-frequency cut-off. This system comprises the amplifying tubes 33, 34, and 35, and the retardation line 12 having a lag of 5 microseconds. The anodes of tubes 34 and 35 are connected in parallel with a charging resistance 36 which forms the input impedance of the artificial line 13. A switch 37 makes possible the application to a desired portion of the retardation line of the above described impulses which have been suitably retarded, each terminal of switch 37 being as shown in the drawing connected to the junction point of two resistances, such as 38 and 39 which constitute an attenuating potentiometer. The values of these resistances are progressively different so that as the switch is moved from one terminal to the next compensation is effected for the weakening of the signals produced by that portion of the artificial line which is used. At 17a is shown an embodiment of the retardation line associated with a switch 40. The impulses which are collected at the switches 37 and 40, respectively, are combined after suitable amplification in the common charging resistance 41 connected to the plate circuit of the tubes 42 and 43. The separating arrangement for the impulses described in connection with Fig. 2 is composed of a first tube 44 which is negatively polarized and which selects, as shown in Fig. 3, the reference impulses. A second tube 45, which is positively polarized and provided with a resistance 46 in series with its grid selects, as shown in Fig. 3, a signal which is passed through a circuit having a low time constant constituted, e. g. by a self-induction provided in the anode circuit of tube 45. After a new amplitude selection effected by a suitably polarized tube 47, a precise peak will be impulse obtained which is used for starting the time base of the verniers.

The invention is not limited to the embodiments specifically disclosed. The devices for practicing the invention may be employed for measuring the transmission time in all kinds of systems or for studying echo phenomena, caused by faults or breaks in transmission circuits. The invention may be used also for studying the propagation of electromagnetic waves.

The invention may be practiced with mechanical waves by providing suitable devices for transforming the mechanical waves into electrical waves.

What is claimed is:

1. A circuit for controlling indications on at least two cathode ray tube indicators each having a pair of sweep electrodes and a pair of indication electrodes comprising means for producing a train of impulses spaced apart in time a predetermined amount, a first sweep frequency generator coupled to said sweep electrodes of a first one of said tubes, means for controlling said first sweep generator in response to said impulses, first delay means for delaying impulses of said train a predetermined amount, inverter means for inverting impulses of said train, combining means for combining said delayed and said inverted impulses to produce a combined train of impulses, filter means for passing the lower frequency components of the impulses of said combined train, means for separating said filtered impulses of said combined train, means for applying the separated impulses corresponding to said inverted train to the indicating electrodes of said first tube to produce a reference pulse, a second sweep generator coupled to the sweep electrodes of a second of said cathode ray tube indicators, means for controlling said second sweep generator in response to the separated delayed impulses of said delayed train, and means for applying impulses from said produced train of impulses to the indicating electrodes of said cathode ray tube indicator.

2. A circuit for controlling indications according to claim 1, further comprising adjustable delay means operatively associated with said inverter means and with said first delay means for adjustably controlling the position of said reference impulses on said cathode ray indicators.

3. A circuit according to claim 1, further comprising adjustable delay means operatively associated with said inverter means and with said first delay means for adjustably controlling the position of said reference impulses on said cathode ray indicators, further comprising means for combining impulses from said produced train to said combining means to combine with said delayed impulses to produce a sharp control pulse for said second sweep generator, wherein said means for applying said impulses from said produced train of impulses to the indicating electrodes of said second tube comprises means for applying said impulses after separation in the output circuit of said means for separating.

4. The combination, in a distance indicating system, of means for transmitting impulses and receiving echoes thereof from different distant reflecting surfaces, a pair of cathode ray devices, each having a viewing screen, means to deflect the ray of one of said oscillographs over a predetermined path on the screen thereof during a predetermined interval following each transmitted impulse, said interval corresponding to the range of said system, means normally to maintain the ray of the other of said devices interrupted, means to supply a pulse of short duration relative to said interval to both of said devices to deflect the beam of said one device from said path during said short pulse and to turn the beam of the other device on during said short pulse, means to deflect the beam of said other device across a predetermined path on the screen thereof during said short pulse, and means to control both of said beams by the received impulses during their traversal of their respective predetermined paths.

5. A pulse echo receiver including means for indicating separately and visually echo signals received from objects at different distances and said respective distances, an independent and auxiliary receiving channel connected to said receiver and blocked normally to said several echo signals, and adjustable means for applying to said independent and auxiliary receiving channel pulses making the channel responsive only to a selected echo signal.

6. In combination, a directive antenna, a cathode ray device having a viewing screen, means to transmit recurrent pulses and to receive echoes thereof on said antenna during a predetermined interval after each pulse, means to deflect the ray of said device across said screen from a predetermined starting position during a small portion of said interval, means to control said ray of said device during said portion of said interval by the received echo, and means to vary the position of both the directive axis of said ray and said starting position alternately whereby an echo occurring during said predetermined interval is indicated in two different positions on said screen in a relation dependent upon the direction from which it is received.

7. In combination, a source of periodic pulses of low frequency, a source of periodic pulses of high frequency, said pulses having such relative duration and frequency that a single one of said high frequency pulses occurs during a low frequency pulse and is short relative thereto, a cathode ray oscillograph having a viewing screen, means to deflect the ray of said oscillograph across said screen during each of said low frequency pulses, means to vary the time phase relation of said low frequency pulses, and means responsive to that one of said high frequency pulses which occurs during the low frequency pulses to produce a variation of said ray at a substantially fixed point in its deflection.

8. In an echo apparatus, the combination of means to produce a periodic pulse wave, the pulses of one polarity thereof having a duration corresponding to the time over which echoes are received, means to produce a periodic pulse of the same frequency short relative to said pulses of one polarity, means to vary the time of occurrence of said short pulse within said pulses of one polarity, a high frequency generator, means adjustable with said last means to vary the phase of said generator as said time is varied, means to produce from the output of said generator an additional pulse occurring during said short pulse and variable in time therewith, a cathode ray device having a viewing screen, and means to deflect the ray of said device across said screen during each of said short pulses and to produce a variation therein during said additional pulse, said variation being visible on said screen, whereby the time of operation of said ray device may be varied throughout the interval over which echoes are received, and a predetermined visible indication appears at a substantially fixed position on said screen irrespective of the adjustment of said adjustable means.

9. In a system for measuring the distance of remote objects by means of reflection of pulses of electromagnetic waves radiated from a transmitter, a plurality of cathode ray indicator tubes upon the fluorescent screens of which distances of remote objects may be indicated by the position of luminous portions thereof, sweep circuit means for providing sweep deflection at different rates of sweep respectively to said cathode ray tubes, a master oscillator, means including said master oscillator for controlling the rate and phase of sweep on at least one of said cathode ray tubes, means including said master oscillator for controlling the timing and the frequency of repetition of pulses radiated by said transmitter, means for applying reflected pulses received from said remote objects to one of said tubes to indicate thereon the approximate range disposition of said objects, means for selecting one of said reflected pulses for display on the screen of a second tube having a faster rate of sweep than said one tube, said last mentioned means including gate circuit means for permitting illumination of the screen of said second tube during one sweep thereof and means controlling said gate circuit means to determine the time relation of the period of said illumination with respect to the time of radiation of the transmitted pulse.

10. In a pulse echo system for measuring distance, a pulse transmitter, a pulse receiver, a source of oscillations, means to key said transmitter to transmit a pulse at a fixed time in the cycle of said oscillations, whereby an echo of said pulse is received in said receiver, the frequency of said oscillations being sufficiently great that said echo is received during a later cycle of said oscillations, a phase shifter connected to said source adjustable for agreement between the time of reception of said echo pulse and a fixed predetermined time in the cycle of oscillations at the output of said phase shifter, and means including said phase shifter to determine the number of cycles of said oscillations between said transmitted pulse and receipt of said echo.

11. In combination, means for generating a continuous constant frequency alternating wave, means for producing under control of said wave a first series of pulses having a constant frequency of recurrence which is controlled in accordance with the frequency of said alternating wave, means for producing a second series of pulses having a longer period than that of said first series of pulses, means under control of the pulses of said second series for producing a third series of pulses which are delayed with respect to the corresponding pulses of said second series by an interval which may vary, the phase relationship between the pulses of said first and second series being such that successive pulses of said third series are coincident with pulses of said first series.

12. Electric delay measuring apparatus comprising means for generating a continuous constant frequency alternating wave, means under control of said wave for producing a first series of similar pulses having a frequency of recurrence equal to the frequency of said wave, means under control of said wave for producing a second series of pulses having a longer period than that of said first series of pulses, means under control of pulses of said second series for producing a third series of pulses which are delayed with respect to corresponding pulses of said second series by an interval which may vary, and means for indicating said delay interval comprising means for shifting the phase of the pulses of one of said first and second series to bring said delayed pulses of said third series into coincidence with pulses of said first series.

13. Electric delay measuring apparatus comprising means for generating a continuous constant frequency alternating wave, means under control of said wave for producing a first series of similar pulses having a frequency of recurrence equal to the frequency of said wave, means under control of said wave for producing a second series of pulses the period of which is an integral multiple of that of said first series of pulses, means under control of the pulses of said second series for producing a third series of pulses having the same period as the pulses of said second series and which are delayed with respect to corresponding pulses of said second series by intervals which may vary, and means utilizing pulses of said first series for indicating said delay.

14. Electric delay measuring apparatus in accordance with claim 13 in which are provided a cathode ray device having a luminescent screen, means for generating a cathode ray beam and means for deflecting the cathode ray beam, means under control of pulses of said first and third series of pulses for causing a deflection of said cathode ray beam along one coordinate, means for producing a substantially linear sweep wave synchronized with the pulses of said second series of pulses, and means under control of said sweep wave for deflecting said cathode ray beam along a second coordinate.

15. An electric delay measuring apparatus comprising means for generating a continuous constant frequency alternating wave, means for producing a first series of periodically recurring pulses having a frequency of recurrence equal to the frequency of said wave, means under control of pulses of said first series for generating a second series of pulses having a period which is an integral multiple of the period of said first series of pulses, means for shifting the phase of the pulses of said second series with respect to pulses of said first series, means for producing a third series of pulses similar to said second series but which are delayed with respect to corresponding pulses of said second series by an amount which may vary, a cathode ray device having means for directing a cathode ray beam upon a luminescent screen, means under control of pulses of said second series for causing said beam to be repeatedly deflected along one coordinate at a frequency of repetition corresponding to the period of said second series of pulses, and means under control of the pulses of said first and third series for causing said beam to be deflected along a second coordinate, whereby there is produced upon said screen a visual indication corresponding to said first and third series of pulses, the position upon the screen of said first series of pulses varying in accordance with said phase shift and the position upon said screen of the visual indication corresponding to said third series of pulses varying in accordance with the amount of said delay.

16. An electric delay measuring apparatus comprising a generator of a continuous constant frequency alternating wave, means for producing a first series of periodically recurring pulses having a frequency of recurrence equal to the frequency of said wave, means under control of pulses of said first series for generating a second series of pulses and a third series of pulses, each of said second and third series having a period which is an integral multiple of the period of said first series of pulses, means for shifting the phase of the pulses of said third series with respect to the pulses of said second series, a cathode ray device having means for directing a cathode ray beam upon a luminescent screen, means under control of pulses of said second series for causing said beam to be repeatedly deflected along one coordinate at a frequency of repetition corresponding to the period of the second series of pulses, means for producing a fourth series of pulses similar to said third series of pulses but which are delayed with respect to corresponding pulses of said third series by an amount which may vary, means for utilizing said first series of pulses and said fourth series of pulses to cause said beam to be deflected along a second coordinate to produce upon said screen a visual indication corresponding to said first and fourth series of pulses, the position upon the screen of the visual indication corresponding to said first series of pulses being fixed and that corresponding to the fourth series of pulses varying in accordance with changes of said phase shift and changes of said delay.

References Cited in the file of this patent

UNITED STATES PATENTS

| | | |
|---|---|---|
| 1,924,174 | Wolf | Aug. 29, 1933 |
| 2,055,883 | Terry | Sept. 29, 1936 |
| 2,181,568 | Kotowski et al. | Nov. 28, 1939 |
| 2,208,422 | Hugon | July 16, 1940 |
| 2,225,046 | Hunter | Dec. 17, 1940 |
| 2,227,598 | Lyman et al. | Jan. 7, 1941 |

UNITED STATES PATENT OFFICE

CERTIFICATE OF CORRECTION

Patent No. 2,855,593                                               October 7, 1958

Paul F. M. Gloess

It is hereby certified that error appears in the above numbered patent requiring correction and that the said Letters Patent should read as corrected below.

In the grant, lines 14 and 15, for "until April 2, 1960" read -- until April 27, 1960 --; in the heading to the printed specification, line 10, for "In France April 2, 1940" read -- In France April 27, 1940 --; line 13, for "Patent expires April 2, 1960" read -- Patent expires April 27, 1960 --.

Signed and sealed this 28th day of July 1959.

(SEAL)

Attest:

KARL H. AXLINE                                                   ROBERT C. WATSON
Attesting Officer                                       Commissioner of Patents